(12) United States Patent
Webster et al.

(10) Patent No.: US 9,330,394 B2
(45) Date of Patent: May 3, 2016

(54) CONTENT MANAGEMENT WITH HIERARCHICAL CONTENT RULES

(71) Applicant: INTEL CORPORATION, Santa Clara, CA (US)

(72) Inventors: Christopher Webster, Redwood City, CA (US); Vishav V. Singh, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 329 days.

(21) Appl. No.: 14/136,877

(22) Filed: Dec. 20, 2013

(65) Prior Publication Data

US 2015/0178333 A1    Jun. 25, 2015

(51) Int. Cl.
G06F 17/30    (2006.01)
G06Q 30/02    (2012.01)

(52) U.S. Cl.
CPC ...................... G06Q 30/02 (2013.01)

(58) Field of Classification Search
CPC ..................... G06F 17/30589; G06F 17/30221
USPC ........................................................ 707/737
See application file for complete search history.

(56) References Cited

U.S. PATENT DOCUMENTS

| 6,794,566 | B2 | 9/2004 | Pachet |
| 6,938,005 | B2 | 8/2005 | Iverson et al. |
| 9,213,858 | B2 * | 12/2015 | Sharma ............... G06F 21/6218 |
| 2008/0140666 | A1 | 6/2008 | D'Alton Harrison |
| 2009/0094279 | A1 * | 4/2009 | Carmeli ............ G06F 17/30038 |
| 2009/0327305 | A1 | 12/2009 | Roberts et al. |
| 2010/0070448 | A1 * | 3/2010 | Omoigui ............. H01L 27/1463 706/47 |
| 2011/0047159 | A1 * | 2/2011 | Baid ................... G06F 17/3071 707/738 |
| 2012/0259899 | A1 | 10/2012 | Irons |
| 2012/0310941 | A1 * | 12/2012 | MacDonald ........ G06F 17/3089 707/740 |
| 2013/0055097 | A1 * | 2/2013 | Soroca ............... G06Q 30/0247 715/738 |
| 2013/0219176 | A1 * | 8/2013 | Akella ................ H04L 63/0815 713/165 |

OTHER PUBLICATIONS

International Search Report and Written Opinion mailed Feb. 6, 2015 for International Application No. PCT/US2014/065784, 13 pages.

* cited by examiner

*Primary Examiner* — Noosha Arjomandi
(74) *Attorney, Agent, or Firm* — Schwabe, Williamson & Wyatt, P.C.

(57) ABSTRACT

Computing apparatus, computer-readable storage medium, and method associated with application of content rules to content. The computing apparatus may have a processor and a content management service to be operated on the processor. The content management service may receive content rules, each content rule specifying one or more criteria for application of the content rule to one or more instances of content. The content management service may identify one or more instances of content that match the criteria specified by the content rules. The content management service may apply one or more of the content rules to the identified one or more instances of content in a hierarchical manner based on a specificity of the criteria, wherein a rule specifying more specific criteria is applied with priority over a rule specifying less specific criteria. Other embodiments may be described and/or claimed.

22 Claims, 8 Drawing Sheets

CONTENT MANAGEMENT WITH HIERARCHICAL CONTENT RULES

TECHNICAL FIELD

Embodiments of the present disclosure are related to the field of content management, and in particular, to the content management through hierarchical content rules.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Business policies defining restrictions on the distribution and consumption of content may be generally be defined in terms of specific shows, episodes, and times. The business policies may require a great deal of manual curation as part of normal content operations to ensure they are properly implemented. This manual curation may be time intensive for content teams tasked with implementing such business policies across a broad range of content. In addition, under the current state of the art, these content teams must ensure that such business policies are properly applied when the content unexpectedly changes, such as when last minute television programming changes occur. If the business policies are not properly implemented, the content distributor runs the risk of violating contracts associated with the content.

DETAILED DESCRIPTION OF ILLUSTRATIVE EMBODIMENTS

Figure 1:
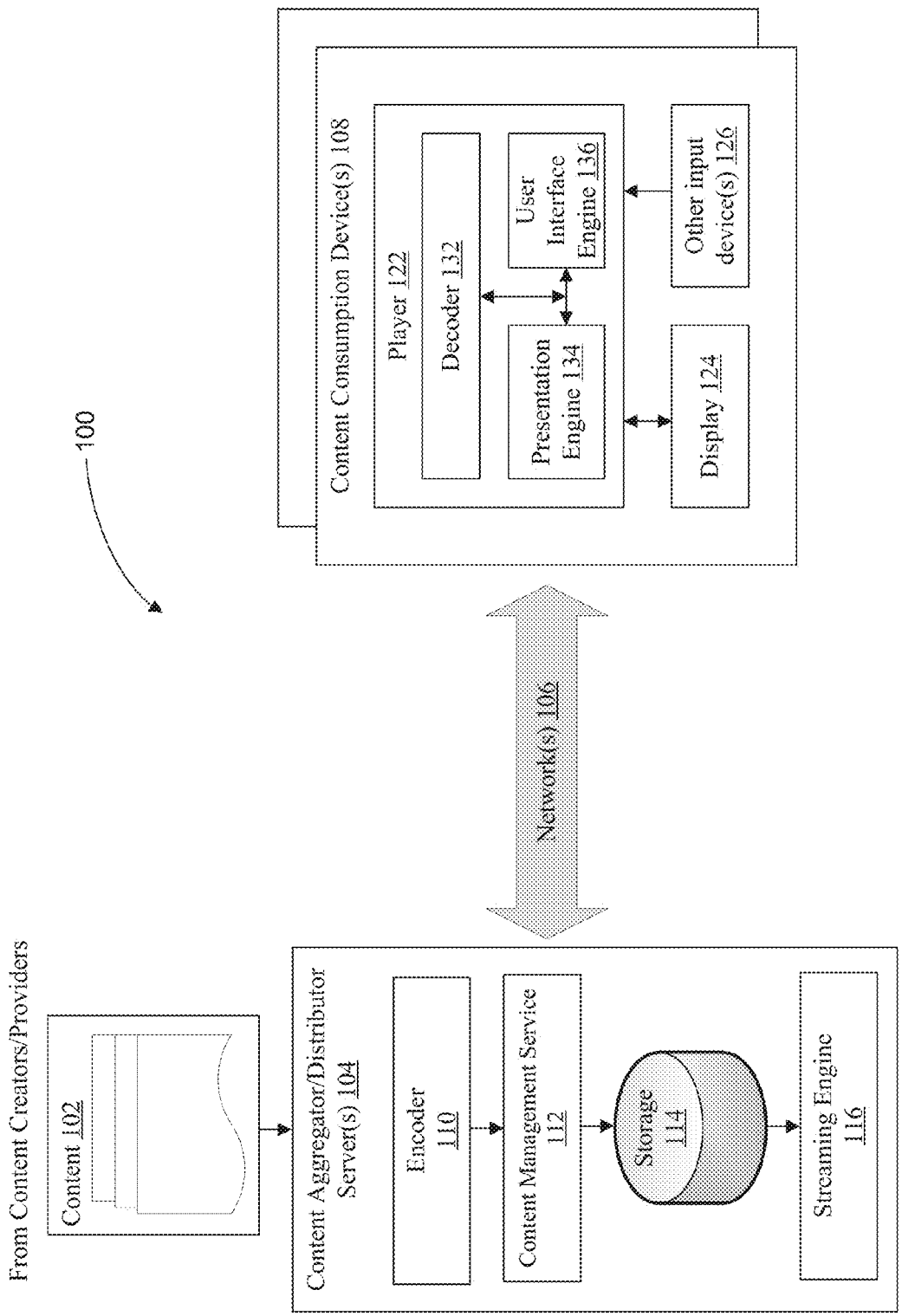
FIG. 1 illustrates an arrangement for content distribution and consumption, in accordance with various embodiments.

Apparatus, computer-readable storage medium and method associated with content distribution and/or consumption are disclosed herein. In embodiments a computing apparatus may have a processor and a content management service to be operated on the processor. The content management service may receive content rules specifying one or more criteria for application of the content rules to instances of content. The criteria may be used to identify one or more instances of content to which to apply one or more of the content rules. In embodiments, the content rules may be applied in a hierarchical manner based on a specificity of the criteria where a content rule specifying more specific criteria may be applied with a higher priority than a content rule specifying less specific criteria. In some embodiments, the content rules may designate restrictions on the consumption and/or control of one or more instances of content, such as restrictions on view-ability, fast forwarding, pausing, and rewinding, for example. The instances of content may be designated by a television programming schedule. The television programming schedule may have metadata associated with specific instances of content and the metadata may contain fields corresponding with the one or more criteria specified by the content rules. In some embodiments, the criteria may designate an episode, season, channel, time, etc. to be utilized in applying the restrictions designated by the content rule. Other embodiments may be described and/or claimed herein.

In the following detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Referring now to FIG. 1, an arrangement for content distribution and consumption, in accordance with various embodiments, is illustrated. As shown, in embodiments, arrangement 100 for distribution and consumption of content may include a number of content consumption devices 108 coupled with one or more content aggregation/distribution servers 104 via one or more networks 106. In some embodiments, content aggregation/distribution servers 104 may be configured to aggregate and distribute content to content consumption devices 108 for consumption, via one or more networks 106. As will be described in more detail below, content aggregation/distribution servers 104 may be incorporated with various teachings of the present disclosure to apply content rules to content 102.

In embodiments, as shown, content aggregation/distribution servers 104 may include encoder 110, storage 114 and streaming engine 116, which may be coupled to each other as shown. Encoder 110 may be configured to encode content 102 from various content providers, and storage 114 may be configured to store encoded content. Streaming engine 116 may be configured to selectively retrieve and stream encoded content to the various content consumption devices 108 in response to requests from the various content consumption devices 108.

Content 102 may, in some embodiments, be multi-media content of various types, having video, audio, and/or closed captions, from a variety of content creators and/or providers. In other embodiments, Examples of content may include, but are not limited to, movies, TV programming, user created content (such as YouTube video, iReporter video), music albums/titles/pieces, and so forth. Examples of content creators and/or providers may include, but are not limited to, movie studios/distributors, television programmers, television broadcasters, satellite programming broadcasters, cable operators, online users, and so forth.

In embodiments, for efficiency of operation, encoder 110 may be configured to encode the various content 102, typically in different encoding formats, into a subset of one or more common encoding formats. However, encoder 110 may be configured to nonetheless maintain indices or cross-references to the corresponding content in their original encoding formats. Similarly, for flexibility of operation, encoder 110 may encode or otherwise process each or selected ones of content 102 into multiple versions of different quality levels. The different versions may provide different resolutions, different bit rates, and/or different frame rates for transmission and/or playing. Encoder 110 may include one or more computing devices configured to perform content segmenting and/or transcoding.

Content management service 112 may be configured to receive and apply one or more content rules to content 102. In embodiments, content management service may be configured to receive the content rules, such as those discussed in reference to FIG. 2 below, over networks 106. Content management service 112 may be configured to apply the content rules to content 102 by matching criteria specified in the content rules with parameters of the content. While content management service is depicted taking the content after encoder 110 has processed the content as input, it will be appreciated that content management service may be located at any point before or after encoder 110, storage 114, or streaming engine 116. Furthermore, it will be appreciated that while content management service 112 is depicted as being located in the content aggregator/distributor servers 104, it will be appreciated that content management service 112 may, in other embodiments, be located before the content aggregator/distributor servers 104, or thereafter in networks 106, or content consumption devices 108. In addition, the content rules may be enforced anywhere in arrangement 100, such as, for example, in streaming engine 116, presentation engine 134, user interface engine 136, or as a separate rule enforcement engine, not depicted. Content management service 112 is discussed in further detail below.

Storage 114 may be temporal and/or persistent storage of any type, including, but not limited to, volatile and non-volatile memory, optical, magnetic and/or solid state mass storage, and so forth. Volatile memory may include, but are not limited to, static and/or dynamic random access memory. Non-volatile memory may include, but are not limited to, electrically erasable programmable read-only memory, phase change memory, resistive memory, and so forth.

Streaming engine 116 may be configured to compress the audio and/or video data of the encoded content (including closed captions, if provided) before transmission to the content consumption devices 108. Compression of audio data may be performed in accordance with, e.g., but are not limited to, the MP3 standard, promulgated by the Moving Picture Experts Group (MPEG). Compression of video data may be performed in accordance with, e.g., but are not limited to, the H264 standard, promulgated by the International Telecommunication Unit (ITU) Video Coding Experts Group (VCEG). Streaming engine 116 may be configured to transmit the compressed audio/video data (and closed captions, if provided) in accordance with any one of a number of streaming and/or transmission protocols. The streaming protocols may include, but are not limited to, the Real-Time Streaming Protocol (RTSP). Transmission protocols may include, but are not limited to, the transmission control protocol (TCP), user datagram protocol (UDP), hypertext terminal protocol (HTTP), web sockets, and so forth.

In other embodiments, content aggregation/distribution servers 104 may be configured to aggregate and distribute content metadata and content consumption devices 108 may be configured to utilize the content metadata to retrieve and consume the content. In such embodiments, content 102 may be content metadata rather than the actual content discussed above. Content 102 may, in such embodiments, be delivered in various formats like Extensible Markup Language (XML), JavaScript Object Notation (JSON), or any other suitable format, from a variety of content creators and/or providers. Encoder 110 may be configured to perform as an ingestion service to ingest content 102 in various different formats, into a subset of one or more system specific normalized formats. However, encoder 110 may be configured to nonetheless maintain indices or cross-references to the corresponding content in their original formats. Similarly, for flexibility of operation, encoder 110 may transform or otherwise process each, or selected ones, of content 102 into several different normalized formats. The different versions may provide the ability to parse the content metadata based on provider, different closed caption options, specific content descriptions and various image sizes for metadata display or discovery. In such embodiments, storage 114 may be configured to store ingested and curated content and streaming engine 116 may be configured to selectively retrieve and stream content metadata to the various content consumption devices 108.

Networks 106 may be any combinations of private and/or public, wired and/or wireless, local and/or wide area networks. Private networks may include, e.g., but are not limited to, enterprise networks. Public networks, may include, e.g., but are not limited to the Internet. Wired networks, may include, e.g., but are not limited to, Ethernet networks. Wireless networks, may include, e.g., but are not limited to, Wi-Fi, or 3G/4G networks. It would be appreciated that at the content distribution end, networks 106 may include one or more local area networks with gateways and firewalls, through which servers 104 go through to communicate with content consumption devices 108. Similarly, at the content consumption end, networks 106 may include base stations and/or access points, through which consumption devices 108 communicate with servers 104. In between the two ends may be any number of network routers, switches and other networking equipment of the like. However, for ease of understanding, these gateways, firewalls, routers, switches, base stations, access points and the like are not shown.

In embodiments, as shown, a content consumption device 108 may include player 122, display 124 and user input device 126. Player 122 may be configured to receive streamed content, decode and recovered the content from the content stream, and present the recovered content on display 124, in response to user selections/inputs from user input device 126.

In embodiments, player 122 may include decoder 132, presentation engine 134 and user interface engine 136. Decoder 132 may be configured to receive streamed content, decode and recover the content from the content stream. Presentation engine 134 may be configured to present the recovered content on display 124, in response to user selections/inputs. User interface engine 136 may be configured to receive the user selections/inputs from a user.

While shown as part of a content consumption device 108, display 124 and/or user input device(s) 126 may be standalone devices or integrated, for different embodiments of content consumption devices 108. For example, for a television arrangement, display 124 may be a stand-alone television set, Liquid Crystal Display (LCD), Plasma and the like, while player 122 may be part of a separate set-top set, and other user input device 126 may be a separate remote control or keyboard. Similarly, for a desktop computer arrangement, player 122, display 124 and other input device(s) 126 may all be separate stand-alone units. On the other hand, for a tablet, smart phone, or other such portable device arrangement, display 124 may be a touch sensitive display screen that includes other user input device(s) 126, and player 122 may be a computing platform with a soft keyboard that also include one of the user input device(s) 126. Further, display 124 and player 122 may be integrated within a single form factor. Similarly, for a smartphone arrangement, player 122, display 124 and other input device(s) 126 may be likewise integrated.

Figure 2:
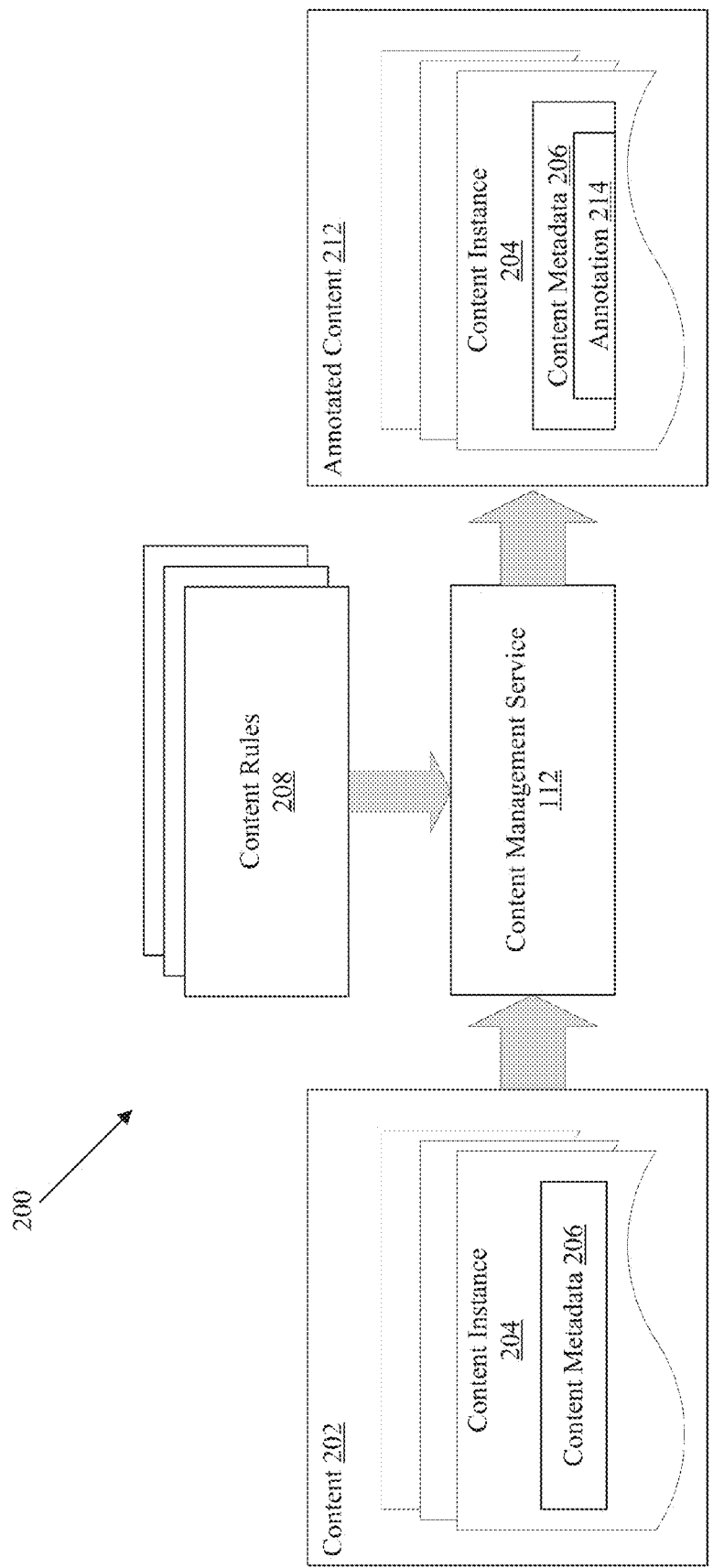
FIG. 2 is a diagram of an illustrative configuration of a content management system, in accordance with various embodiments.

FIG. 2 is a diagram of an illustrative configuration of a content management process 200, in accordance with various embodiments. Content management process may include content management service 112. Content management service 112 may take as input content 202 and content rules 208 and may output annotated content 212.

Content 202 may be similar to content 102 discussed above in reference to FIG. 1; however, content 202 utilizes a different reference number to reflect that content 202 may be in a different state than content 102 of FIG. 1, e.g., content 202 may be encoded. In embodiments, content 202 may be linear content, such as that associated with a television programming schedule. As used herein, linear content may be content that progresses without any navigational control and may have a specific television channel, or television network, on which it is distributed at a specified time. In other embodiments, content 202, may be non-linear content, such as video on demand (VoD) or content that may be stored on a digital video recorder (DVR). In some embodiments, as discussed above in reference to FIG. 1, content 202 may be content metadata rather than actual content and, in such embodiments, content 202 may be data describing the above described content.

In embodiments, content instance 204 may include content metadata 206. Content metadata 206 may include one or more parameters associated with content instance 204. In embodiments, content metadata 206 may include parameters, such as, but not limited to, a series identifier, an episode identifier, a season identifier, a time identifier, a source of the content, a show type, and/or a programming type. A series identifier may identify a specific series, such as, "CSI." An episode identifier may identify one or more episodes of a series. Similarly, a season identifier may identify one or more seasons of a series. A time identifier may indicate a start time of content instance 204 and may also include a duration and/or end time of content instance 204. A source of the content may identify the content creator and/or a provider of the content. Show type may identify the manner in which the instance of content was originally produced and/or distributed, such as paid programming. Program type may identify a type of program the content may be associated with such as a sporting event, movie, etc. These examples are merely meant to be illustrative of possible fields included in content metadata 206 and should not be viewed as limiting of the present disclosure.

In embodiments, content rules 208 may be selected to implement one or more business and/or content policies. Content rules 208 may designate one or more content permissions or restrictions related to one or more instances of content, such as content instance 204. Each rule of content rules 208 may designate one or more criteria corresponding to one or more of the parameters contained in content metadata 206.

Each rule of content rules 208 may designate one or more permissions or restrictions to apply to content found to match the designated criteria to effectuate the content rule. For example, permissions or restrictions may include, whether a consumer may view, skip, fast forward, pause, rewind, or record the content, and may further include blackout rules that may prevent the content from being displayed and thereby consumed. The rules may also be used to support advertising enforcement during consumption by providing, for example, permissions or restrictions pertaining to whether advertisements may be skipped or fast forwarded through. Such advertising enforcement may be separate from those restrictions or permissions related to the content itself. For example, content may be able to be fast forwarded through, but advertisements may not be. In some embodiments, the rules may not merely permit or restrict the consumer, but may also permit or restrict, further processing and/or insertions to the content. For example, whether additional encoding or local insertion of advertisements may be permitted or restricted. It will be appreciated that the above examples are merely utilized to illustrative purposes and should not be viewed as limiting of this disclosure. Any type or permissive or restrictive content rule is contemplated by this disclosure.

Each rule of content rules 208 may also designate a duration with which to apply the permission or restriction. For instance, a permission or restriction may only apply, for example, for the first 24 hours after the content initially aired after which the permission or restriction may no longer be valid. It will be appreciated that any duration may be utilized and the example above is merely for illustrative purposes.

Finally, the rules may implement geographic restrictions or permissions. For instance, content viewing may only be allowed within a specific geographic region, such as within a predefined number of miles from a city. These geographic restrictions may also be utilized for advertising restrictions, for example, advertisements may not be allowed to be replaced with other advertisements within a specific geographic region, but may be allowed to be replaced outside this region. Such geographic permissions or restrictions may be enabled by adding a set of allowed geographic area criteria that can include country, state, county, city, a range of miles from such locations, or any other method of identifying a geographic region. Such criteria may be able to be enforced by determining a location of content consumption, such as, for example, by a service (not depicted) on content aggregator/distributor servers 104 or content consumption devices 108.

Content rules may be in any data format, including XML, JSON, or any other suitable format. In embodiments utilizing an XML data format, the XML may have an XML Schema defined with which the XML may need to comply. Likewise, in embodiments utilizing a JSON data format the JSON may have a JSON Schema defined with which the JSON may need to comply.

In some embodiments, content management service 112 may be configured to process content 202 on the fly as the content is being streamed, for example, by streaming engine 116 or played by, for example, player 122, both of FIG. 1. In other embodiments, content management service 112 may be configured to process batches of content 202 before content 202 is to be streamed and/or played. Content metadata may, in some embodiments, be configured to apply content rules 208 in a hierarchical manner. In embodiments, content management service 112 may be configured to accomplish a hierarchical rule application by assigning a priority, or weight, to each of the criteria associated with a rule and calculating a sum, average, or other suitable calculation to reflect an aggregate priority for the rule and arrive at hierarchical ordering of the rules. For example, if criteria of a first rule designate a channel identifier, a series identifier, and a season identifier with priorities of 5, 4, and 3, respectively then the first rule may have a priority of 12 utilizing the sum of the priorities. Whereas, if a second rule merely designates a channel identifier, then the priority of the rule may merely be 5. In some embodiments, the priority of a rule may determine the order of application of the individual rule. For example, the rules may be applied in order from highest to lowest priority, or vice versa. In other embodiments, the priority may be utilized when two rules have a conflict to determine which rule to apply. Returning to the example discussed above, if the first rule designates that a user cannot record the content associated with the rule and the second rule designates that a user may record the content, then the first rule will take priority over the second rule and; therefore, will be applied instead of the conflicting second rule. In other embodiments, only a single rule may be applied to each instance of content and the rule with the highest, or lowest, priority may be applied to the instance of content.

In some embodiments, the content management service 112 may be configured to use a sorting algorithm, such as a radix sort where the highest weight for the remaining rule attributes may be utilized in creating a branch of a tree data structure until no more rules are remaining. For example, for a rule where the associated criteria may have priorities of 5 and 3, a branch of a tree data structure may be formed where the branch may have a parent 5 with one child, a 3. The 3 may have a single leaf child containing the rule. An in order traversal of such a tree can be performed by finding the largest non-leaf (a tree with a leaf and sub nodes may treat the leaf as the lowest value) and traversing down to determine a priority of the rule. As a side effect sibling level leaf rules may be flagged as non-deterministic behavior as there may only be a partial ordering.

In embodiments, content management service 112 may be configured to apply one or more content rules of content rules 208 to identified content instances, such as content instance 204. This may be accomplished, in some embodiments, by annotating the associated content metadata 206 to include permissions or restrictions defined by the content rule, such as annotation 214. Content management service may then be configured to output annotated content 212 containing content metadata 206 having annotation 214 applied thereto. These annotations may then be enforced by a component, such as streaming engine 116, of content aggregator/distributor servers 104 of FIG. 1 or may be enforced by a component, such as presentation engine 134, of content consumption devices.

Figure 3:
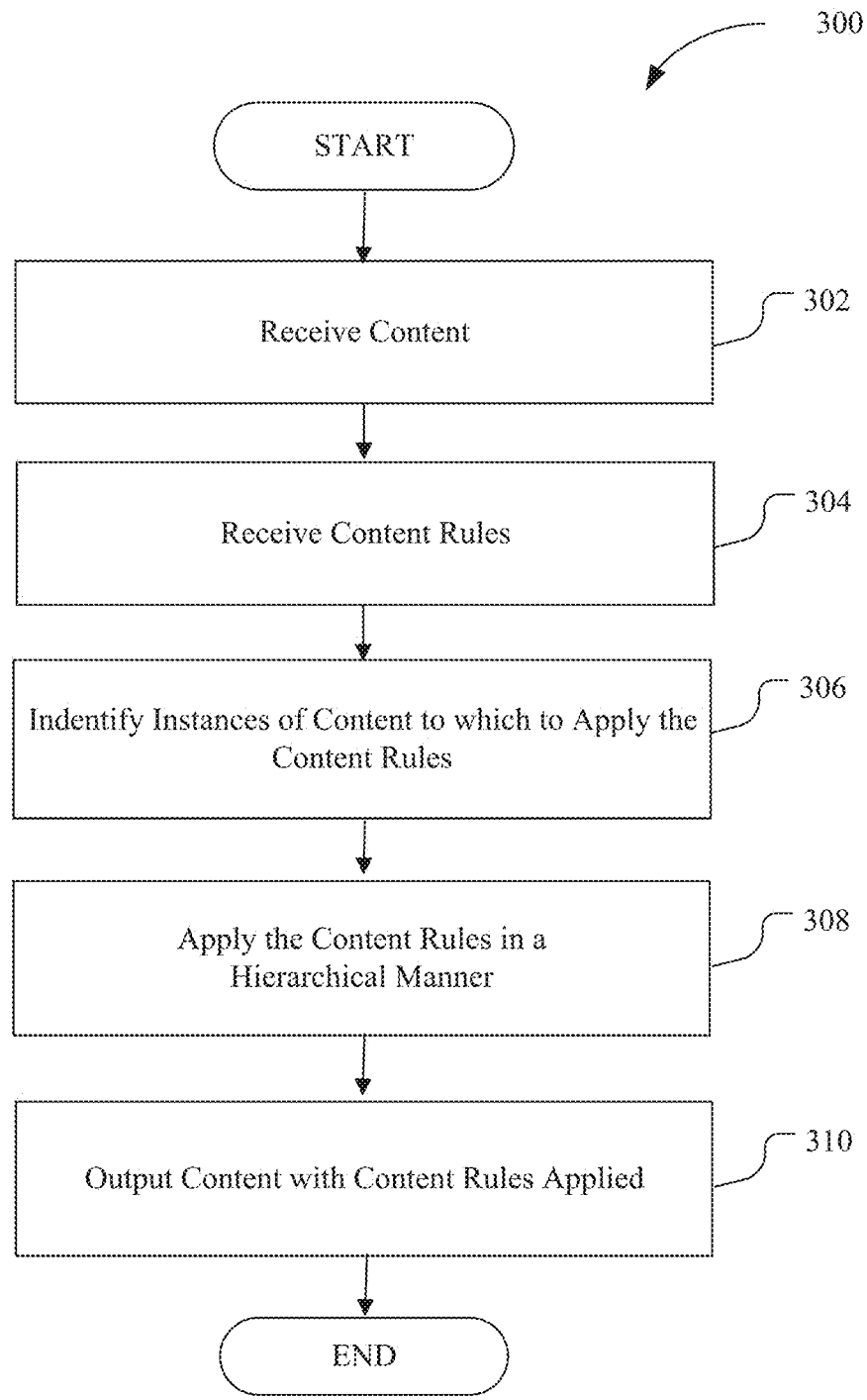
FIG. 3 illustrates an example process for applying content rules, in accordance with various embodiments.

This automated application of the content rules may enable more efficient application of the content rules over manual curation of the content rules. With the automated application, the only need for manual curation may arise when an exception to a rule may exist. Furthermore, FIG. 3 illustrates an example process 300 for applying content rules by a content management service, such as content management service 112 of FIG. 1, in accordance with various embodiments. At block 302 content management service may receive content, such as content 102 of FIG. 1 or 202 of FIG. 2. This content may be received upon request by the content management service, when a change is made to the content, e.g., when a television schedule changes, when a rule change is implemented, or may be periodically sent to the content management service. In embodiments, the content itself may be sent, in other embodiments, only the metadata associated with the content may need to be sent for processing by the content management service. In such embodiments, the metadata may be reassociated with the content after processing by the content management service.

At block 304 content management service may receive content rules, such as content rules 208 of FIG. 2. These content rules may be received upon request by the content management service, when a change is made to the content, e.g., when a television schedule changes, when a rule change is implemented, or may be periodically sent contemporaneously with the content to the content management service. As discussed above, the content rules may be received in any format including XML, JSON, or any other suitable format. The content rules may designate one or more criteria with which to use in identifying content to which the rule may be applied.

At block 306 content management service may identify instances of content to which to apply the content rules. This may be accomplished by identifying instances of content having metadata with parameters defined therein that match the criteria designated by the individual rules. For instance, if a content rule indicates that the rule should be applied to episode 1 of season 3 of a specific television show and the parameters designated by the content metadata of one of the instances of content matches this criteria, then the content may be identified as an instance of content to which at least one content rule applies. In performing this identification process, if the content metadata contains a parameter not designated by the content rule, this parameter may be ignored in some embodiments. For instance, returning to the previous example, if a content rule indicates that the rule should be applied to episode 1 of season 3 of a specific television show and the parameters designated by the content metadata include parameters which match the designated criteria but also include a parameter that indicates the content is to be aired at 7:00 PM Eastern Time on a specific date, these additional parameters may be ignored and the content may be identified as a match.

Once instances of content to which to apply the content rules have been identified, then the content rules may be applied to the identified content in a hierarchical manner at block 308. In embodiments, content management service may accomplish this hierarchical rule application, as discussed above, by assigning a priority, or weight, to each of the criteria associated with a rule and calculating a sum or average of the priorities of the criteria for the rule. In some embodiments, the priority of a rule may determine the order of application of the individual rule. For example, the rules may be applied in order from highest to lowest priority, or vice versa. In other embodiments, the priority may be utilized when two rules have a conflict to determine which rule to apply. In addition, the rule may be applied, as discussed above, by annotating the content metadata to include permissions or restrictions defined by the content rule. Content management service may then be configured to output at block 310 the annotated content.

Figure 4:
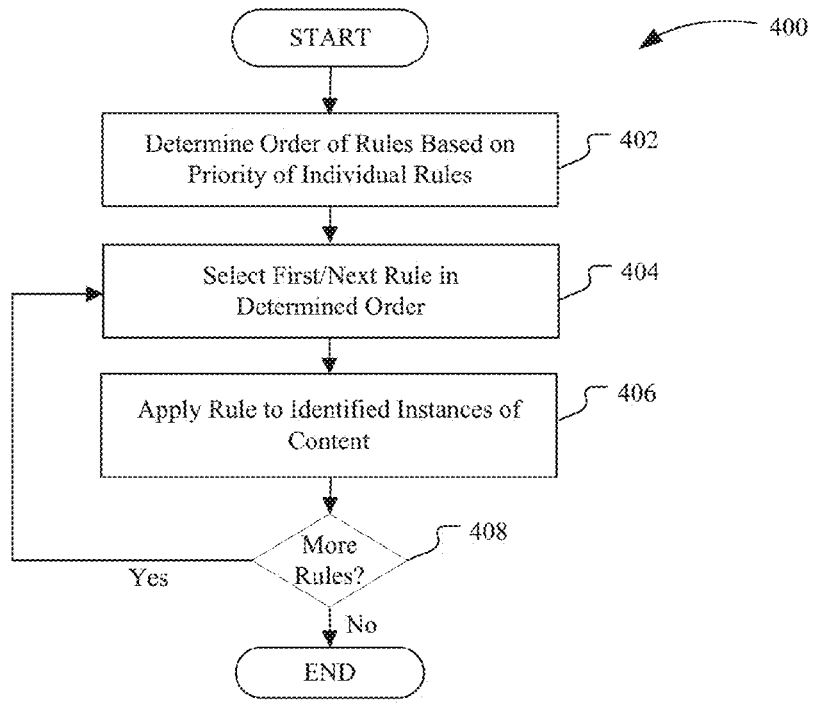
FIG. 4 illustrates an example process for hierarchically applying content rules, in accordance with various embodiments.

FIG. 4 illustrates an example process 400 for hierarchically applying content rules, in accordance with various embodiments of the process depicted in block 308 of FIG. 3. The process may begin at block 402 where an order of rules, such as those received in block 304 of FIG. 3, may be determined based upon the priorities associated with criteria designated by the individual rules. This ordering may be from highest to lowest priority, or vice-versa, and may be determined by simply calculating a priority associated with the individual rules by, for example, summing, averaging, etc. the priorities of the criteria and utilizing this priority of the rule in a sorting algorithm to determine an order of priorities. In other embodiments, the ordering may be determined utilizing a radix sort, such as that discussed above in reference to FIG. 2, and further discussed below in reference to FIG. 7.

In block 404 the first rule, or next rule depending upon the stage of processing, may be selected from the ordered rules. In block 406 the selected rule may be applied to the instances of content identified in block 306 of FIG. 3. In block 406 the rule may be applied to the identified instances of content. This may be accomplished by determining all instances of content metadata having parameters which match the criteria specified in the selected rule and annotating each of these instances of content with the selected rule.

In some embodiments, multiple rules may match the same instance of content. In such embodiments, cumulative rules, rules that do not conflict with any rules that have already been applied, may be applied in succession, while a rule that may conflict with an already applied rule may be ignored resulting in the highest priority rule being applied in the event that two rules conflict. At block 408 a determination may be made as to whether there are any more rules to process. If there are more rules to process the process may return to block 404 where the next rule may be selected and the process described above may be repeated. If there are no more rules to process, all rules have been applied and the process may end.

Figure 5:
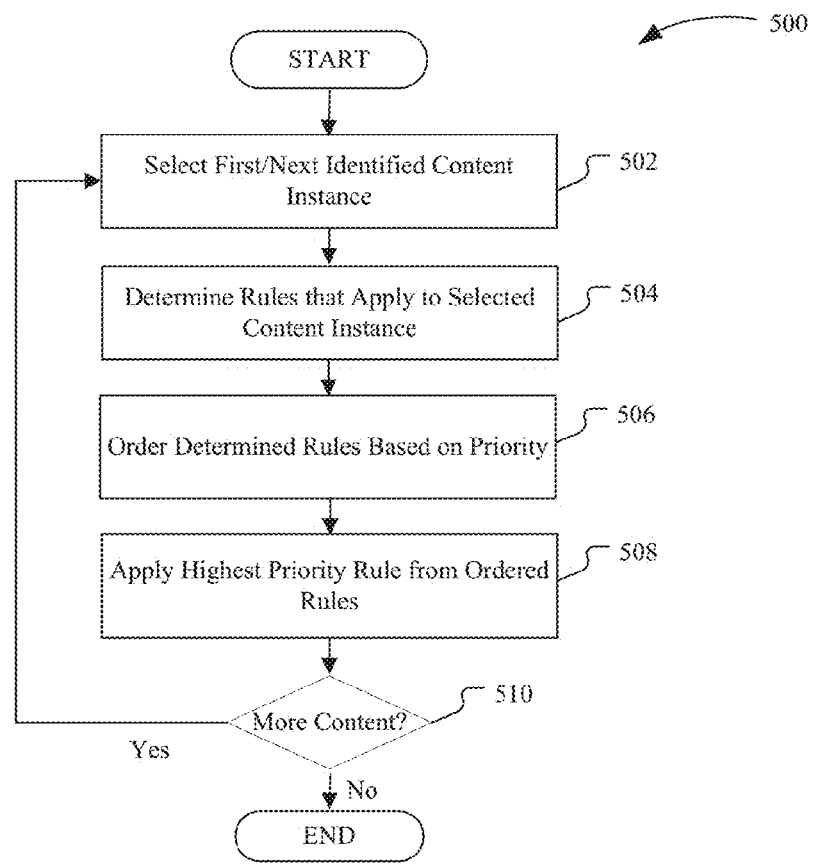
FIG. 5 illustrates an additional example process for hierarchically applying content rules, in accordance with various embodiments.

FIG. 5 illustrates an additional example process for hierarchically applying content rules, in accordance with various embodiments. The process may begin at block 502 where a first instance of content, or next instance of content depending upon the stage of processing, may be selected from identified instances of content, such as those identified in block 306 of FIG. 3. In some embodiments, these instances of content may be instances of content metadata rather than the actual instances of content.

In block 504 the content rules that apply to the selected instance of content may be determined. This may be accomplished by identifying all of those rules having criteria which match parameters of the content metadata of the selected instance of content. In block 506 the determined rules may be ordered based upon priorities associated with criteria designated by the individual rules. This ordering may be from highest to lowest priority, or vice-versa, and may be determined by simply calculating a priority associated with the individual rules, e.g., by summing, averaging, etc. the priorities of the criteria, and utilizing this priority in a sorting algorithm to determine an order of priorities. In other embodiments, the ordering may be determined utilizing a radix sort, such as that discussed above in reference to FIG. 2, and further discussed below in reference to FIG. 7.

In block 508, according to some embodiments, the highest priority rule of the ordered rules may be applied to the selected instance of content. In other embodiments where rules may be cumulative, e.g., rules that do not conflict with any rules that have already been applied, and may be applied in succession, while rules that may conflict with an already applied rule may be ignored resulting in the highest priority rule being applied in the event that two rules conflict. At block 510 a determination may be made as to whether there are any more instances of content to process. If there are more instances of content to process the process may return to block 502 where the next instance of content may be selected and the process described above may be repeated. If there are no more instances of content to process, all instances of content have been processed and the process may end.

Figure 6:
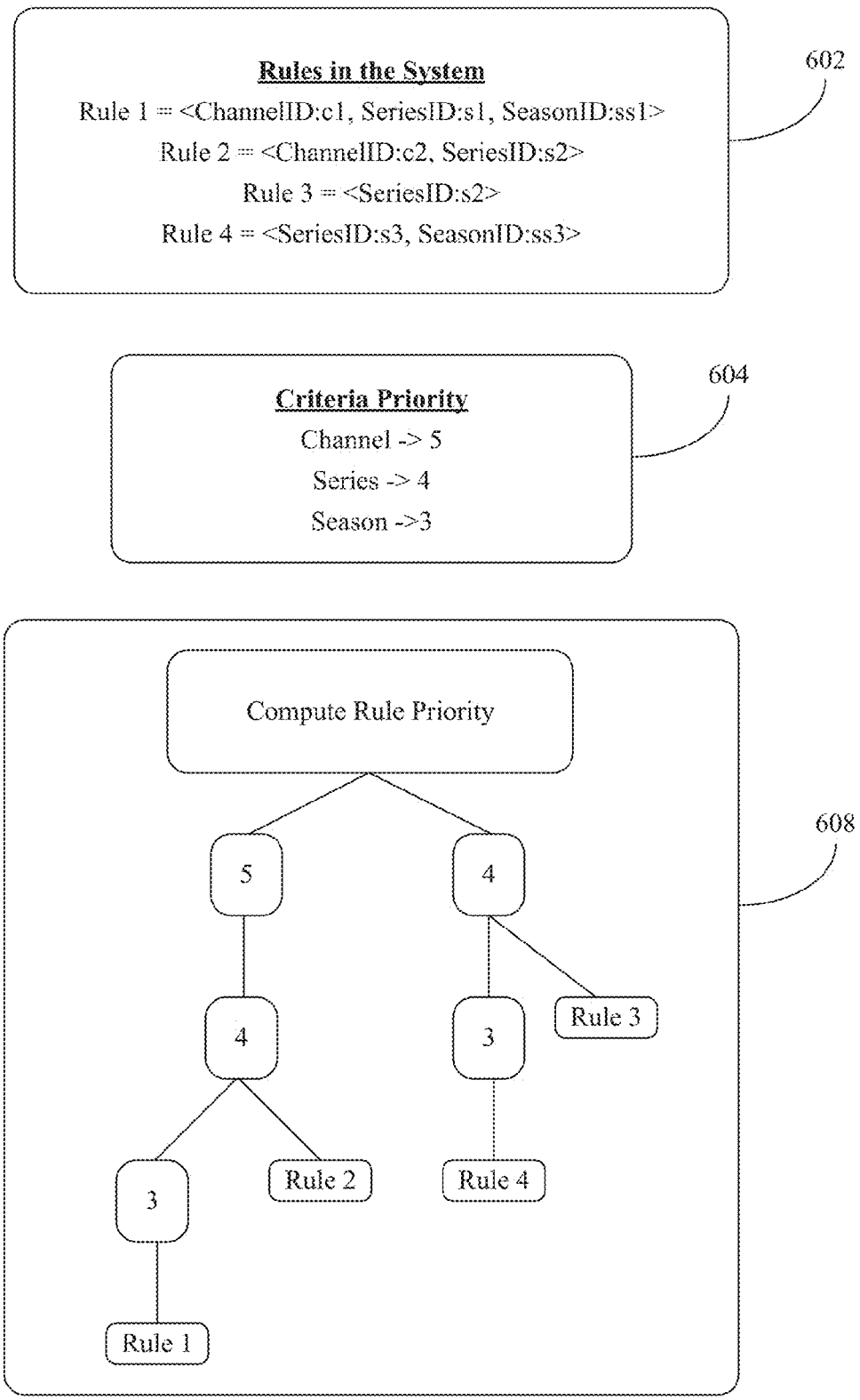
FIG. 6 illustrates an example rule priority determination, in accordance with various embodiments.

FIG. 6 illustrates an example rule priority determination utilizing a rule priority tree, in accordance with various embodiments. In block 602 illustrative rule criteria is defined for rules 1-4 and in block 604 a priority for each of those illustrative criteria is defined. Block 608 then depicts a radix sort where the highest weight for the remaining rule attributes may be utilized in creating a branch of a tree data structure until no more rules are remaining. For example, as illustrated, rule 1 is a leaf of a branch of the rule priority tree. The ancestors of rule 1, are "3," "4," and "5" reflecting the priorities associated with the criteria of rule 1. This is similarly depicted for rules 2-4 as well.

Figure 7:
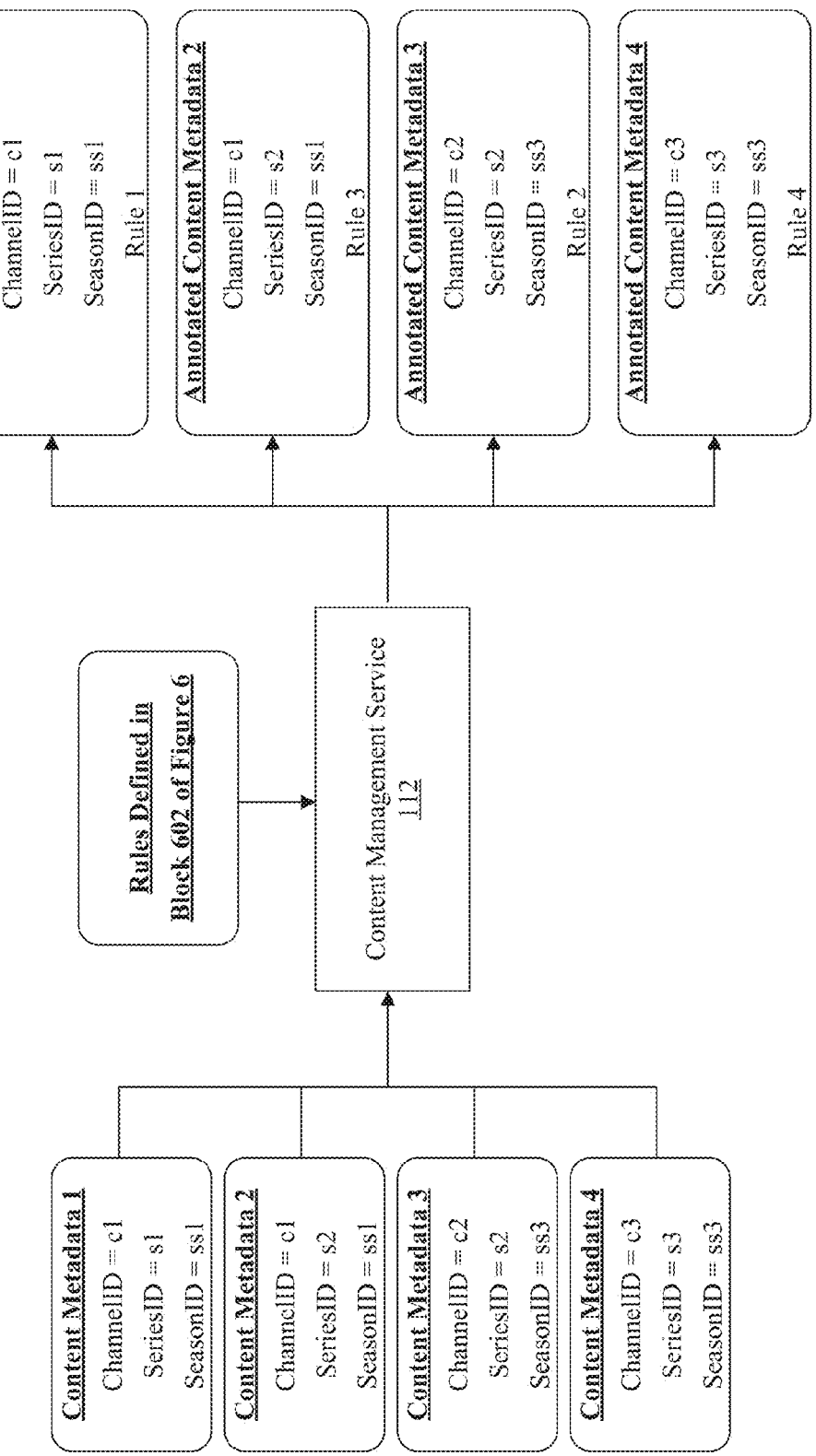
FIG. 7 illustrates example rule application to content metadata, in accordance with various embodiments.

FIG. 7 illustrates example rule application to content metadata, in accordance with various embodiments. As depicted, content management service 112 may take as input content metadata 1-4 having the parameters designated therein and the rules defined in block 602 of FIG. 6. Content management service 112 may process content metadata 1-4 and the rules of 602 as described above in FIGS. 2-6 and output annotated content metadata 1-4 having the rules 1-4 applied to the metadata. As can be seen, although rules 2 and 3 both have criteria which match the parameters of content metadata 3, only rule 2 has been applied. This may be the result of rule 2 having higher priority, as depicted in FIG. 6, and may be further based upon whether the two rules are conflicting or cumulative. If rules 2 and 3 did not conflict and were applied cumulatively, it will be appreciated that content metadata 3 may have both rules 2 and 3 applied.

Figure 8:
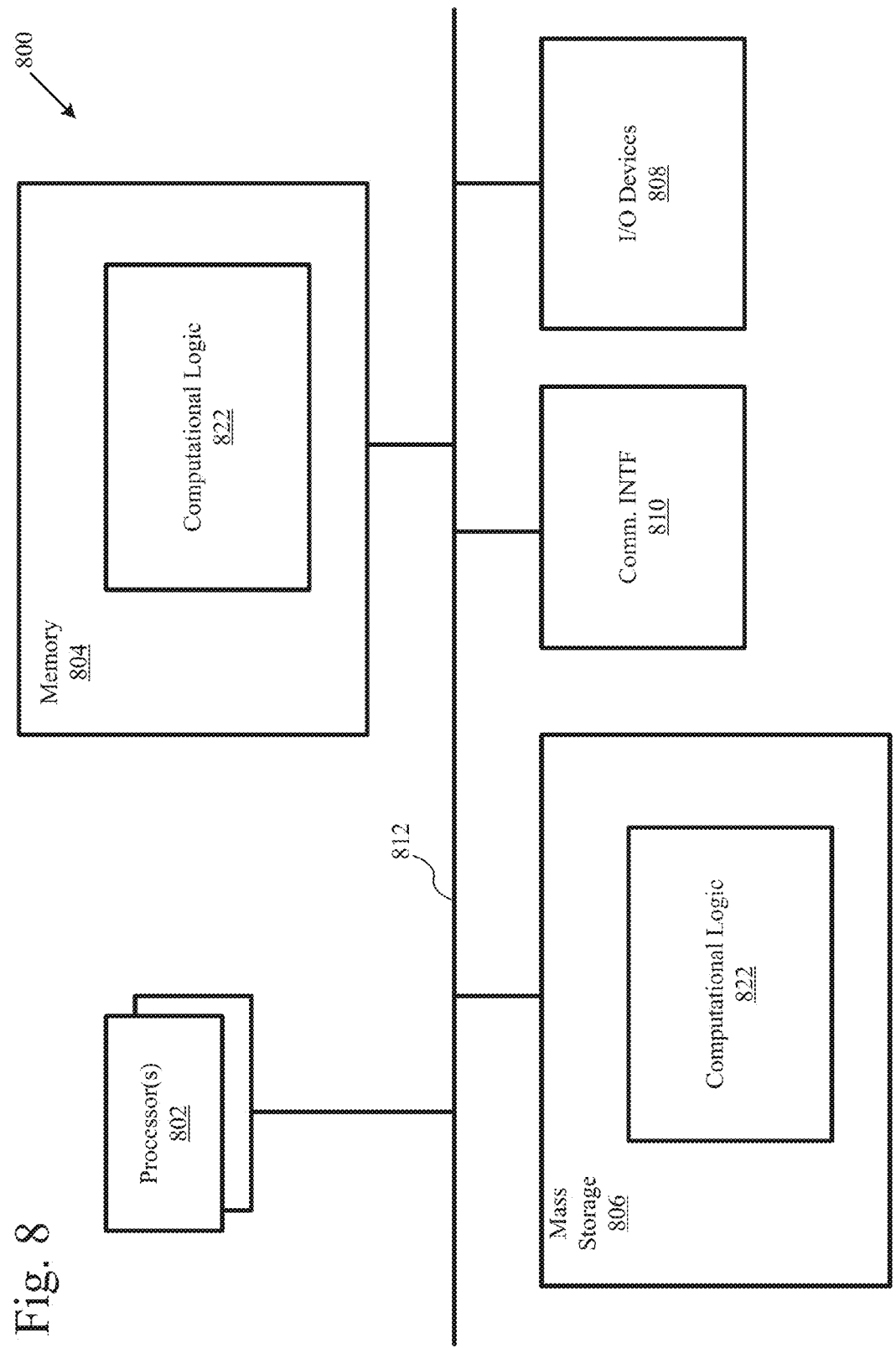
FIG. 8 illustrates an example computing environment suitable for practicing the disclosure, in accordance with various embodiments.

Referring now to FIG. 8, an example computer suitable for implementing various embodiments, is illustrated. As shown, computer 800 may include one or more processors or processor cores 802, and system memory 804. For the purpose of this application, including the claims, the terms "processor" and "processor cores" may be considered synonymous, unless the context clearly requires otherwise. Additionally, computer 800 may include mass storage devices 806 (such as diskette, hard drive, compact disc read only memory (CD-ROM) and so forth), input/output devices 808 (such as display, keyboard, cursor control and so forth) and communication interfaces 810 (such as network interface cards, modems and so forth). The elements may be coupled to each other via system bus 812, which may represent one or more buses. In the case of multiple buses, they may be bridged by one or more bus bridges (not shown).

Each of these elements may perform its conventional functions known in the art. In particular, system memory 804 and mass storage device 806 may be employed to store a working copy and a permanent copy of the programming instructions implementing the operations associated with carrying out the processes or procedures described above in reference to FIGS. 2-7. The various elements may be implemented by assembler instructions supported by processor(s) 802 or high-level languages, such as, for example, C, that can be compiled into such instructions.

The permanent copy of the programming instructions may be placed into permanent storage devices 806 in the factory, or in the field, through, for example, a distribution medium (not shown), such as a compact disc (CD), or through communication interface 810 (from a distribution server (not shown). That is, one or more distribution media having an implementation of the instructions for carrying out the processes or procedures described above in reference to FIGS. 2-7 may be employed to distribute the instructions and program various computing devices.

The number, capability and/or capacity of these elements 810-812 may vary, depending upon the requirements. Their constitutions are otherwise known, and accordingly will not be further described. While depicted herein as a physical computer implementation, this disclosure should not be so limited and, it will be appreciated that, the computer implementation may be a virtual computer implementation as well.

Figure 9:
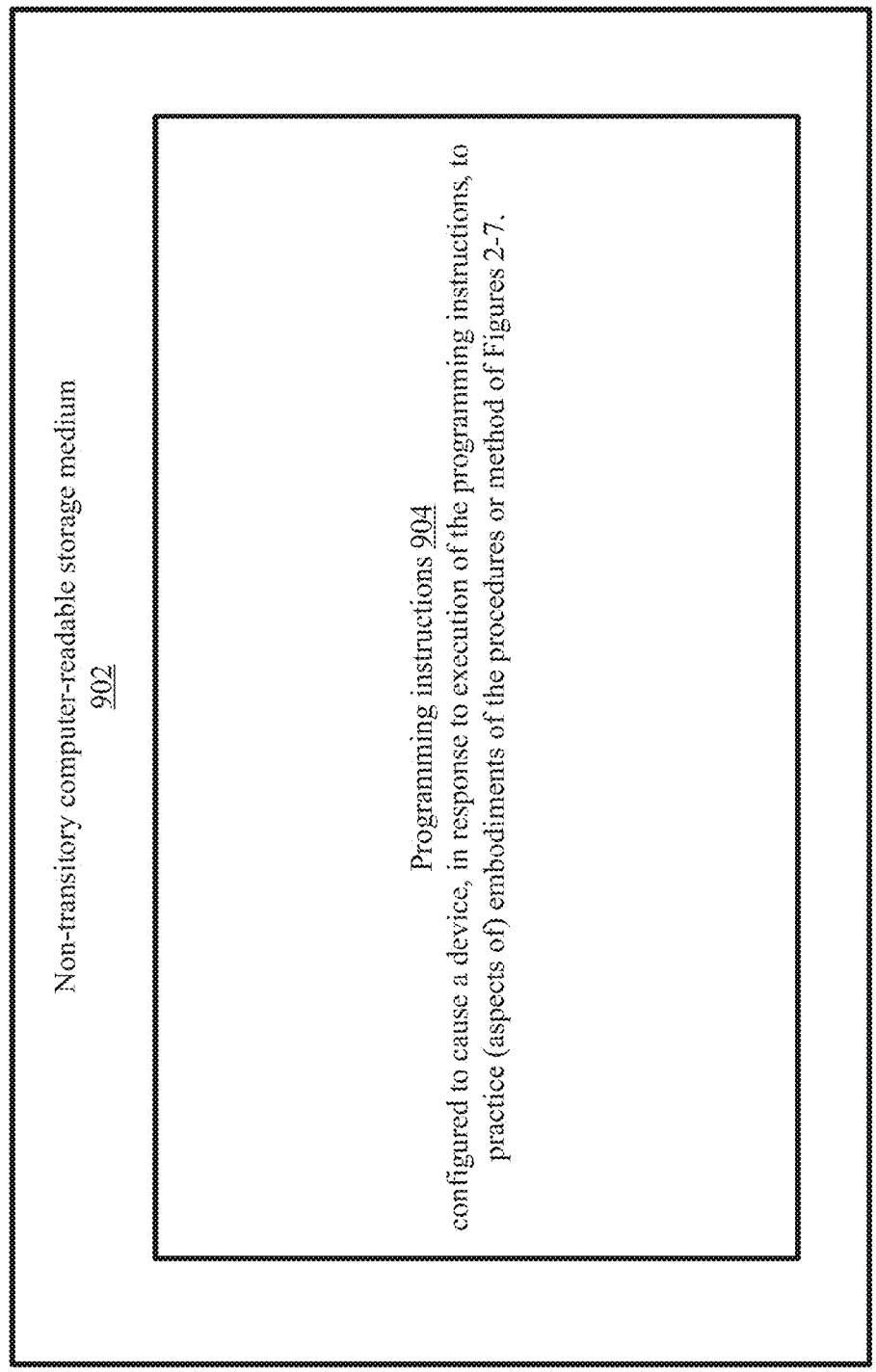
FIG. 9 illustrates an example storage medium with instructions configured to enable an apparatus to practice the present disclosure, in accordance with various embodiments.

FIG. 9 illustrates an example non-transitory computer-readable storage medium having instructions configured to practice all or selected ones of the operations depicted in FIGS. 2-7, earlier described; in accordance with various embodiments. As illustrated, non-transitory computer-readable storage medium 902 may include a number of programming instructions 904. Programming instructions 904 may be configured to enable a device, e.g., computer 700, in response to execution of the programming instructions, to perform, e.g., various operations of the processes depicted in FIGS. 2-7. In alternate embodiments, programming instructions 904 may be disposed on multiple non-transitory computer-readable storage media 902 instead.

Embodiments of the disclosure can take the form of an entirely hardware embodiment, an entirely software embodiment or an embodiment containing both hardware and software elements. In various embodiments, software, may include, but is not limited to, firmware, resident software, microcode, and the like. Furthermore, the disclosure can take the form of a computer program product accessible from a computer-usable or computer-readable medium providing program code for use by or in connection with a computer or any instruction execution system.

For the purposes of this description, a computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

EXAMPLES

Example 1 is a computing apparatus comprising: a processor; and a content management service to be operated on the processor to: receive a plurality of content rules, each of the content rules specifying one or more criteria for application of the content rule to one or more instances of content of a plurality of instances of content; identify one or more instances of content that match the criteria specified by one or more of the plurality of content rules; and apply the one or more of the plurality of content rules to the corresponding identified one or more instances of content in a hierarchical manner based on a specificity of the criteria, wherein a rule specifying more specific criteria is applied with priority over a rule specifying less specific criteria.

Example 2 may include the subject matter of Example 1, wherein to apply the one or more of the plurality of content rules in a hierarchical manner comprises: order the content rules based on priorities associated with the specified criteria of the individual rules; and apply the content rules in order to individual instances of content of the identified one or more instances of content.

Example 3 may include the subject matter of Example 1, wherein to apply the one or more of the plurality of content rules in a hierarchical manner comprises: select an instance of content from the identified one or more instances of content; determine a set of one or more rules of the plurality of content rules to be applied to the selected instance of content; order the set of one or more rules based on priorities associated with the specified criteria of the individual rules; and apply the rules in the determined order to individual instances of content identified in the one or more instances of content.

Example 4 may include the subject matter of Example 1, wherein the plurality of content rules are to implement a content policy.

Example 5 may include the subject matter of Example 1, wherein the plurality of instances of content are associated with respective content metadata and wherein identification of one or more instances of content further comprises identification of content metadata containing parameters that match the criteria specified by one or more of the plurality of content rules.

Example 6 may include the subject matter of Example 5, wherein to apply the one or more of the plurality of rules to the corresponding identified one or more instances of content comprises annotation of the respective content metadata with the one or more of the plurality of the rules.

Example 7 may include the subject matter of any one of Examples 1-6, wherein the plurality of instances of content are associated with a television program schedule.

Example 8 may include the subject matter of any one of Examples 1-6, wherein the criteria includes one or more of an episode identifier, a season identifier, a series identifier, or a channel identifier and the content metadata contains parameters that correspond with the criteria.

Example 9 may include the subject matter of any one of Examples 1-6, wherein the plurality of content rules are specified in one of Extensible Markup Language (XML) or JavaScript Object Notation (JSON) format.

Example 10 may include the subject matter of any one of Examples 1-6, wherein to apply a rule specifying more specific criteria with priority over a rule of the plurality of rules specifying less specific criteria comprises application of the rule specifying more specific criteria instead of the rule specifying less specific criteria when there is a conflict between the rules.

Example 11 is at least one computer-readable storage medium having instructions stored thereon which, when executed by a computing device, provide the computing device with a content management service to: receive a plurality of content rules, each of the content rules specifying one or more criteria for application of the content rule to one or more instances of content of a plurality of instances of content; identify one or more instances of content that match the criteria specified by one or more of the plurality of content rules; and apply the one or more of the plurality of content rules to the corresponding identified one or more instances of content in a hierarchical manner based on a specificity of the criteria, wherein a rule specifying more specific criteria is applied with priority over a rule specifying less specific criteria.

Example 12 may include the subject matter of Example 11, wherein to apply the one or more of the plurality of content rules in a hierarchical manner comprises: order the content rules based on priorities associated with the specified criteria of the individual rules; and apply the rules in order to individual instances of content of the identified one or more instances of content.

Example 13 may include the subject matter of Example 11, wherein to apply the one or more of the plurality of content rules in a hierarchical manner comprises: select an instance of content from the identified one or more instances of content; determine a set of one or more rules of the plurality of content rules to be applied to the selected instance of content; order the set of one or more rules based on priorities associated with the specified criteria of the individual rules; and apply the rules in order to individual instances of content identified in the one or more instances of content.

Example 14 may include the subject matter of Example 11, wherein the plurality of content rules are to implement a content policy.

Example 15 may include the subject matter of Example 11, wherein the plurality of instances of content are associated with respective content metadata and wherein to identify one or more instances of content further comprises identify content metadata containing parameters that match the criteria specified by one or more of the plurality of content rules.

Example 16 may include the subject matter of Example 15, wherein to apply the one or more of the plurality of rules to the corresponding identified one or more instances of content comprises annotation of the respective content metadata with the one or more of the plurality of the rules.

Example 17 may include the subject matter of any one of Examples 11-16, wherein the plurality of instances of content are associated with a television program schedule.

Example 18 may include the subject matter of any one of Examples 11-16, wherein the criteria includes one or more of an episode identifier, a season identifier, a series identifier, or a channel identifier and the content metadata contains parameters that correspond with the criteria.

Example 19 may include the subject matter of any one of Examples 11-16, wherein the plurality of content rules are specified in one of Extensible Markup Language (XML) or JavaScript Object Notation (JSON) format.

Example 20 may include the subject matter of any one of Examples 11-16, wherein to apply a rule specifying more specific criteria with priority over a rule specifying less specific criteria comprises application of the rule specifying more specific criteria instead of the rule specifying less specific criteria when there is a conflict between the rules.

Example 21 is a computer implemented method comprising: receiving, by a content management service of a computing device, a plurality of content rules, each of the content rules specifying one or more criteria for application of the content rule to one or more instances of content of a plurality of instances of content; identifying, by the content management service, one or more instances of content that match the criteria specified by one or more of the plurality of content rules; and applying, by the content management service, the one or more of the plurality of content rules to the corresponding identified one or more instances of content in a hierarchical manner based on a specificity of the criteria, wherein a rule specifying more specific criteria is applied with priority over a rule specifying less specific criteria.

Example 22 may include the subject matter of Example 21, wherein applying the one or more of the plurality of content rules in a hierarchical manner comprises: ordering the content rules based on priorities associated with the specified criteria of the individual rules; and applying the rules in the determined order to individual instances of content of the identified one or more instances of content.

Example 23 may include the subject matter of Example 21, wherein applying the one or more of the plurality of content rules in a hierarchical manner comprises: selecting an instance of content from the identified one or more instances of content; determining a set of one or more rules of the plurality of content rules to be applied to the selected instance of content; ordering the set of one or more rules based on priorities associated with the specified criteria of the individual rules; and applying the rules, in order, to individual instances of content identified in the one or more instances of content.

Example 24 may include the subject matter of Example 21, wherein the plurality of content rules are to implement a content policy.

Example 25 may include the subject matter of Example 21, wherein the plurality of instances of content are associated with respective content metadata and wherein identifying one or more instances of content further comprises identifying content metadata containing parameters that match the criteria specified by one or more of the plurality of content rules.

Example 26 may include the subject matter of Example 25, wherein applying one or more of the plurality of rules to the corresponding identified one or more instances of content comprises annotating the respective content metadata with the one or more of the plurality of the rules.

Example 27 may include the subject matter of any one of Examples 21-26, wherein the plurality of instances of content are associated with a television program schedule.

Example 28 may include the subject matter of any one of Examples 21-26, wherein the criteria includes one or more of an episode identifier, a season identifier, a series identifier, or a channel identifier and the content metadata contains parameters that correspond with the criteria.

Example 29 may include the subject matter of any one of Examples 21-26, wherein the plurality of content rules are specified in one of Extensible Markup Language (XML) or JavaScript Object Notation (JSON) format.

Example 30 may include the subject matter of any one of Examples 21-26, wherein applying a rule specifying more specific criteria with priority over a rule of the plurality of rules specifying less specific criteria comprises applying the rule specifying more specific criteria instead of the rule specifying less specific criteria when there is a conflict between the rules.

Example 31 is a computing apparatus for content management comprising: means for receiving, by a content management service of a computing device, a plurality of content rules, each of the content rules specifying one or more criteria for application of the content rule to one or more instances of content of a plurality of instances of content; means for identifying, by the content management service, one or more instances of content that match the criteria specified by one or more of the plurality of content rules; and means for applying, by the content management service, the one or more of the plurality of content rules to the corresponding identified one or more instances of content in a hierarchical manner based on a specificity of the criteria, wherein a rule specifying more specific criteria is applied with priority over a rule specifying less specific criteria.

Example 32 may include the subject matter of Example 31, wherein means for applying the one or more of the plurality of content rules in a hierarchical manner further comprises: means for ordering the content rules based on priorities associated with the specified criteria of the individual rules; and means for applying the rules, in order, to individual instances of content of the identified one or more instances of content.

Example 33 may include the subject matter of Example 31, wherein means for applying the one or more of the plurality of content rules in a hierarchical manner further comprises: means for selecting an instance of content from the identified one or more instances of content; means for determining a set of one or more rules of the plurality of content rules to be applied to the selected instance of content; means for ordering the set of one or more rules based on priorities associated with the specified criteria of the individual rules; and means for applying the rules, in order, to individual instances of content identified in the one or more instances of content.

Example 34 may include the subject matter of Example 31, wherein the plurality of content rules are to implement a content policy.

Example 35 may include the subject matter of Example 31, wherein the plurality of instances of content are associated with respective content metadata and wherein identifying one or more instances of content further comprises identifying content metadata containing parameters that match the criteria specified by one or more of the plurality of content rules.

Example 36 may include the subject matter of Example 31, wherein applying one or more of the plurality of rules to the corresponding identified one or more instances of content comprises annotating the respective content metadata with the one or more of the plurality of the rules.

Example 37 may include the subject matter of any one of Examples 31-36, wherein the plurality of instances of content are associated with a television program schedule.

Example 38 may include the subject matter of any one of Examples 31-36, wherein the criteria includes one or more of an episode identifier, a season identifier, a series identifier, or a channel identifier and the content metadata contains parameters that correspond with the criteria.

Example 39 may include the subject matter of any one of Examples 31-36, wherein the plurality of content rules are specified in one of Extensible Markup Language (XML) or JavaScript Object Notation (JSON) format.

Example 40 may include the subject matter of any one of Examples 31-36, wherein applying a rule specifying more specific criteria with priority over a rule of the plurality of rules specifying less specific criteria comprises applying the rule specifying more specific criteria instead of the rule specifying less specific criteria when there is a conflict between the rules.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the disclosure. This application is intended to cover any adaptations or variations of the embodiments discussed herein. Therefore, it is manifestly intended that the embodiments of the disclosure be limited only by the claims and the equivalents thereof.

What is claimed is:

1. A computing apparatus comprising:
a processor; and
a content management service to be operated on the processor to:
receive a plurality of content rules, each of the content rules specifying one or more criteria for application of the content rule to one or more instances of content of a plurality of instances of content;
identify one or more instances of content that match the criteria specified by one or more of the plurality of content rules; and
apply the one or more of the plurality of content rules to the corresponding identified one or more instances of content in a hierarchical manner based on a specificity of the criteria,
wherein a rule specifying more specific criteria is applied with priority over a rule specifying less specific criteria, and
wherein respective content metadata of the corresponding identified one or more instances of content is annotated with the one or more plurality of the rules.

2. The computing apparatus of claim 1, wherein to apply the one or more of the plurality of content rules in a hierarchical manner comprises:
order the content rules based on priorities associated with the specified criteria of the individual rules; and
apply the content rules in order to individual instances of content of the identified one or more instances of content.

3. The computing apparatus of claim 1, wherein to apply the one or more of the plurality of content rules in a hierarchical manner comprises:
select an instance of content from the identified one or more instances of content;
determine a set of one or more rules of the plurality of content rules to be applied to the selected instance of content;
order the set of one or more rules based on priorities associated with the specified criteria of the individual rules; and
apply the rules in the determined order to individual instances of content identified in the one or more instances of content.

4. The computing apparatus of claim 1, wherein the plurality of instances of content are associated with respective content metadata and wherein identification of one or more instances of content further comprises identification of content metadata containing parameters that match the criteria specified by one or more of the plurality of content rules.

5. The computing apparatus of claim 1, wherein the plurality of instances of content are associated with a television program schedule.

6. The computing apparatus of claim 1, wherein the criteria includes one or more of an episode identifier, a season identifier, a series identifier, or a channel identifier and the content metadata contains parameters that correspond with the criteria.

7. The computing apparatus of claim 1, wherein the plurality of content rules are specified in one of Extensible Markup Language (XML) or JavaScript Object Notation (JSON) format.

8. The computing apparatus of claim 1, wherein to apply a rule specifying more specific criteria with priority over a rule of the plurality of rules specifying less specific criteria comprises application of the rule specifying more specific criteria instead of the rule specifying less specific criteria when there is a conflict between the rules.

9. At least one non-transitory computer-readable storage medium having instructions stored thereon which, when executed by a computing device, provide the computing device with a content management service to:
receive a plurality of content rules, each of the content rules specifying one or more criteria for application of the content rule to one or more instances of content of a plurality of instances of content;
identify one or more instances of content that match the criteria specified by one or more of the plurality of content rules; and apply the one or more of the plurality of content rules to the corresponding identified one or more instances of content in a hierarchical manner based on a specificity of the criteria,
wherein a rule specifying more specific criteria is applied with priority over a rule specifying less specific criteria, and
wherein respective content metadata of the corresponding identified one or more instances of content is annotated with the one or more plurality of the rules.

10. The non-transitory computer-readable storage medium of claim 9, wherein to apply the one or more of the plurality of content rules in a hierarchical manner is to:
order the content rules based on priorities associated with the specified criteria of the individual rules; and
apply the rules in order to individual instances of content of the identified one or more instances of content.

11. The non-transitory computer-readable storage medium of claim 9, wherein to apply the one or more of the plurality of content rules in a hierarchical manner comprises:
select an instance of content from the identified one or more instances of content;
determine a set of one or more rules of the plurality of content rules to be applied to the selected instance of content;
order the set of one or more rules based on priorities associated with the specified criteria of the individual rules; and
apply the rules in order to individual instances of content identified in the one or more instances of content.

12. The non-transitory computer-readable storage medium of claim 9, wherein the plurality of instances of content are associated with respective content metadata and wherein to identify one or more instances of content further comprises identification of content metadata containing parameters that match the criteria specified by one or more of the plurality of content rules.

13. The non-transitory computer-readable storage medium of claim 9, wherein the criteria includes one or more of an episode identifier, a season identifier, a series identifier, or a channel identifier and the content metadata contains parameters that correspond with the criteria.

14. The non-transitory computer-readable storage medium of claim 9, wherein the plurality of content rules are specified in one of Extensible Markup Language (XML) or JavaScript Object Notation (JSON) format.

15. The non-transitory computer-readable storage medium of claim 9, wherein to apply a rule specifying more specific criteria with priority over a rule specifying less specific criteria comprises application of the rule specifying more specific criteria instead of the rule specifying less specific criteria when there is a conflict between the rules.

16. A computer implemented method comprising:
receiving, by a content management service of a computing device, a plurality of content rules, each of the content rules specifying one or more criteria for application of the content rule to one or more instances of content of a plurality of instances of content;
identifying, by the content management service, one or more instances of content that match the criteria specified by one or more of the plurality of content rules; and applying,
by the content management service, the one or more of the plurality of content rules to the corresponding identified one or more instances of content in a hierarchical manner based on a specificity of the criteria,
wherein a rule specifying more specific criteria is applied with priority over a rule specifying less specific criteria, and
wherein respective content metadata of the corresponding identified one or more instances of content is annotated with the one or more plurality of the rules.

17. The method of claim 16, wherein applying the one or more of the plurality of content rules in a hierarchical manner comprises:
ordering the content rules based on priorities associated with the specified criteria of the individual rules; and
applying the rules in the determined order to individual instances of content of the identified one or more instances of content.

18. The method of claim 16, wherein applying the one or more of the plurality of content rules in a hierarchical manner comprises:
selecting an instance of content from the identified one or more instances of content;
determining a set of one or more rules of the plurality of content rules to be applied to the selected instance of content;
ordering the set of one or more rules based on priorities associated with the specified criteria of the individual rules; and
applying the rules, in order, to individual instances of content identified in the one or more instances of content.

19. The method of claim 16, wherein the plurality of instances of content are associated with respective content metadata and wherein identifying one or more instances of content further comprises identifying content metadata containing parameters that match the criteria specified by one or more of the plurality of content rules.

20. The method of claim 16, wherein the plurality of instances of content are associated with a television program schedule.

21. The method of claim 16, wherein the criteria includes one or more of an episode identifier, a season identifier, a series identifier, or a channel identifier and the content metadata contains parameters that correspond with the criteria.

22. The method of claim 16, wherein applying a rule specifying more specific criteria with priority over a rule of the plurality of rules specifying less specific criteria comprises applying the rule specifying more specific criteria instead of the rule specifying less specific criteria when there is a conflict between the rules.

* * * * *